J. T. JOHNSON.
AUTOMOBILE SIGNAL.
APPLICATION FILED DEC. 19, 1908.
949,433.
Patented Feb. 15, 1910.
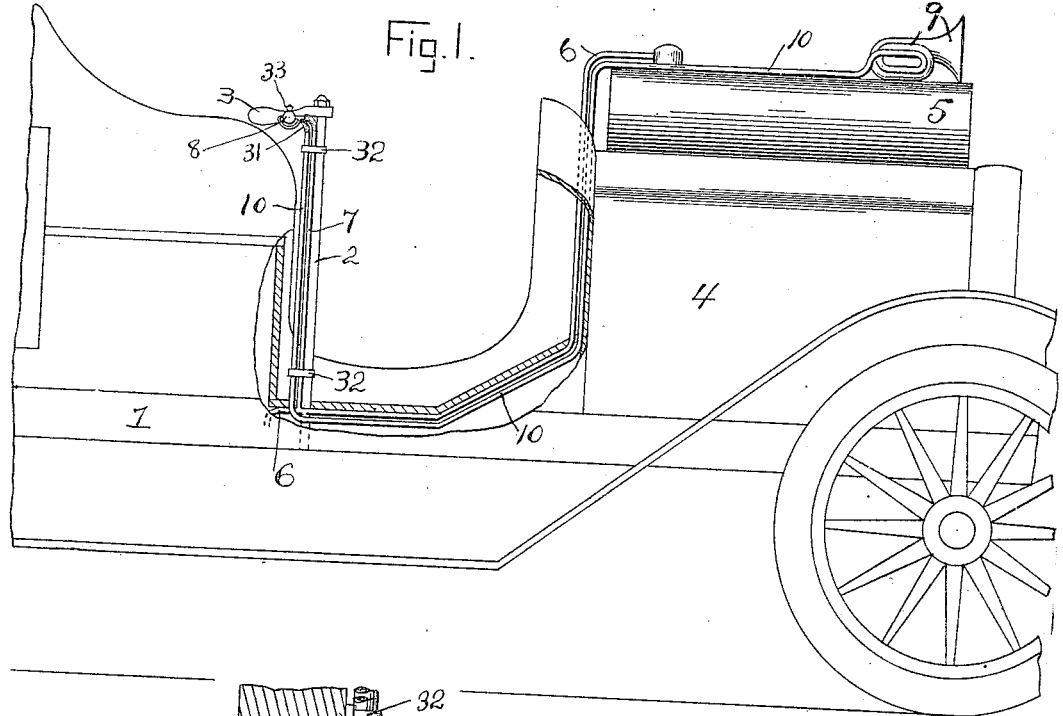
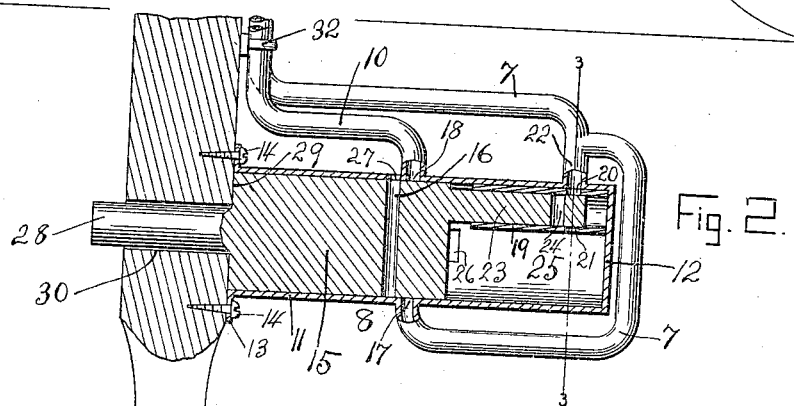
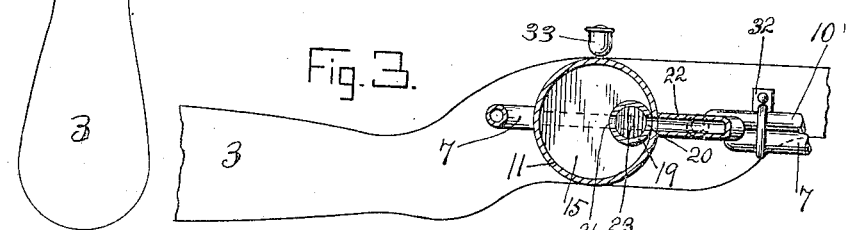
WITNESSES
INVENTOR
James T. Johnson,
by T. K. Bryant, Attorney.

UNITED STATES PATENT OFFICE.

JAMES T. JOHNSON, OF MEMPHIS, TENNESSEE.

AUTOMOBILE-SIGNAL.

949,433.

Specification of Letters Patent.   Patented Feb. 15, 1910.

Application filed December 19, 1908.   Serial No. 468,401.

*To all whom it may concern:*

Be it known that I, JAMES T. JOHNSON, a citizen of the United States, residing at Memphis, in the county of Shelby and State of Tennessee, have invented certain new and useful Improvements in Automobile-Signals, of which the following is a specification.

The present invention relates to improvements in automobile signals and more especially to the class of signals actuated by fluid pressure.

An object of this invention is the provision of a signal such as an automobile horn in direct communication with a storage tank of compressed air and means to instantaneously supply such air to the horn. The main object to be accomplished, however, is the ready accessibility to the finger of the automobile operator of the push-button for operating the signal, without requiring the removal of the hand from the steering member.

A further object is to provide an actuating valve upon the steering member itself and of such compact form as to be unobjectionable.

With these general objects in view and others that will be readily understood as the nature of the invention is better described, the invention consists substantially in the novel construction, combination and arrangement of parts, hereinafter fully set forth, illustrated in the accompanying drawings and pointed out in the appended claims.

In the drawing, forming a part of this application, and in which the same characters of reference designate corresponding parts throughout the several views, Figure 1 is a side elevation of a part of an automobile provided with my improvement, Fig. 2 is a longitudinal section of the actuating valve mounted upon the steering member, and Fig. 3 is a transverse section of the valve taken on line 3—3 of Fig. 2.

Referring in detail to the drawings, the automobile frame 1 is provided with a steering post 2 having a steering arm or lever 3 near the top thereof. Upon the hood 4 is mounted a suitable reservoir 5 for the storage under pressure of a fluid, such as compressed air, which may be desired for use upon the automobile. In this connection it will be noted that such storage reservoir may be placed at any convenient point upon the machine and may be filled in any manner, such as by the use of an air compressor, carried upon the machine or located at a central station. The use of compressed air becoming general, it is employed not only in giving a signal but for actuating the brakes as set forth in my prior patent thereon numbered 872,732; the employment of compressed air for steering purposes is also generally known as the same forms my invention set forth in Patent Number 872,820.

The form of steering post and lever disclosed in the present drawings is that employed with the use of compressed air as the steering agent and as now manufactured under my last named Letters Patent. It is, nevertheless, to be understood that my valve may be readily affixed to the ordinary steering wheel or any steering means now in use, as it is to the lever herein shown.

Leading from the storage reservoir 5 is the air outlet tube or pipe 6, leading to different parts of the machine. For supplying air in the present instance, I employ a branch pipe 7 which leads to the actuating valve 8 mounted upon the steering member 3, and the air passing through the valve reaches the horn 9 by means of the pipe 10.

The general features now being apparent, the construction of the valve 8 will be described and in what manner the same regulates the flow of air from the reservoir to the horn or signal to be operated thereby. Said valve consists of a tubular casing 11 closed at one end 12 and provided at its opposite end with an annular projecting flange 13, through which by suitable fastening means 14, said casing is secured to a mounting such as the steering lever 3. A movable valve member 15 closely fits within the casing 11 and is provided with a transverse port 16 adapted to be brought into registry with the main inlet port 17 and the main outlet port 18 of said casing, communicating respectively with the inlet pipe 7 and outlet pipe 10 but said valve member is normally positioned to close both of said ports.

Positioned within the casing 11 contiguous the end 12 and in longitudinal alinement with the main outlet port 18 is the auxiliary cylindrical casing 19, provided with alining inlet and outlet ports 20 and 21 respectively. A short stub-pipe 22 leads from the main air inlet pipe and is tapped through the casing 11 communicating with said inlet port 20.

A finger member 23 projects from the valve member 15 and closely fits the auxiliary casing 19 and is provided with a transverse port 24 arranged parallel with the port 16; said finger normally closing the ports 20 and 21 but upon movement of the valve member 15 adapted to bring the port 24 into registry with said ports 20 and 21, thus allowing egress of air to the compression chamber 25 of the casing 11 at the same instant and during the entire period that port 16 conducts the air from pipe 7 to pipe 10. Exhaust port 26 allows the escape of air from chamber 25 and exhaust port 27 from the port 16 upon the return of the valve member and finger to normal position as shown in Fig. 2.

The valve member 15 is provided with a central projection or push rod 28 by pressing which, movement is imparted to the valve member. The adjacent portion of the valve member forms an annular shoulder 29 resting against the side of the guide lever 3, while the rod 28 projects through a perforation 30 in said lever.

The conducting pipes 7 and 10 need be only slightly slack, pliable or resilient as at 31 for allowing the free use of the guide lever and a slight looseness of thin metallic tubing has been found sufficient and serviceable. The piping may be retained in its place by rings secured to the lever and steering post as at 32 or said piping may be inclosed in any form of conduit. I also preferably employ an oil cup 33 for lubricating the valve and the same may be mounted directly upon the casing 11 or upon an adjacent part and led thereto by an oil pipe.

It will be seen that a pressure exerted upon the outer end of the push rod 28, for instance, by the thumb of the chauffeur, will impel the valve member toward the closed end 12 of the casing; this movement will be limited by the contacting of the free end of the finger 23 with the casing end 12 and in this latter position the transverse port 16 will register with ports 17 and 18, thus opening the valve and blowing the horn. During this position also, the port 24 of the finger admits air to the chamber 25 at which time the exhaust port 26 is closed by the valve member. Upon releasing the pressure of the thumb from the push rod 28 the air compressed within the chamber 25 returns the valve member to normal position abutting the lever 3, when the port 16 is out of registry as is likewise the port 24; the air in chamber 25 escapes through the exhaust port 26 and whatever air is confined in the transverse port 16 escapes through the exhaust port 27.

While the form of my invention herein disclosed and described is what is believed to be the preferable embodiment thereof, it is however to be understood that changes in form, proportion and minor details may be made without departing from the spirit and scope thereof and of the appended claims.

Having thus fully described my invention and in what manner the same is designed for use, what I claim as new and desire to secure by Letters Patent of the United States, is:—

1. A device of the class described, comprising a signal, a compressed fluid storage tank, a valve casing provided with inlet ports and an outlet port, a tubular passage between said tank and inlet ports and between said outlet port and signal, an auxiliary casing smaller than and positioned within said valve casing, alining ports through said auxiliary casing and one of said ports in communication with one of said inlet ports, a movable valve member within said casing and a finger projection carried thereby and closely fitting said auxiliary casing, said projection having a transverse port therethrough and the valve casing having an exhaust port, said valve member provided with a transverse port adapted to make and break communication between the other inlet and the outlet port.

2. A device of the class described, comprising a signal, a compressed fluid storage tank, a tubular valve casing provided with an inlet and an outlet port, a tubular passage between said tank and inlet port and between said outlet port and signal, an auxiliary casing positioned within said valve casing, an inlet and alining outlet port provided through said auxiliary casing, a by-pass inlet passage tapped through said valve casing and alining with the inlet port of said auxiliary casing, a movable valve member within said valve casing and a finger projection carried thereby and closely fitting within said auxiliary casing, said valve member provided with a transverse port adapted to make and break communication between the inlet and outlet ports of the valve casing and said finger projection provided with a transverse port adapted to synchronously make and break communication between the inlet and outlet ports of the auxiliary casing, said valve casing provided with a compression chamber and having an exhaust port leading therefrom, said outlet port of the auxiliary chamber communicating with the compression chamber and a means for moving said valve member.

3. A valve comprising a tubular casing having an inlet and an outlet port, an auxiliary casing positioned within said tubular casing, an inlet and an alining outlet port provided through said auxiliary casing, a by-path inlet passage tapped through said tubular casing and alining with the inlet port of said auxiliary casing, a movable valve member within said tubular casing and a finger projection carried thereby and closely fitting within said auxiliary casing, said valve member provided with a transverse port adapted to make and break communication between the inlet and outlet ports of the tubular casing and said finger projection provided with a transverse port adapted to synchronously make and break communication between the inlet and outlet ports of the auxiliary casing, said tubular casing provided with a compression chamber and having an exhaust port leading therefrom, the outlet port of said auxiliary casing communicating with said compression chamber, and a means for moving said valve member.

4. A valve comprising a casing provided with inlet ports and an outlet port, an auxiliary casing smaller than and positioned within said valve casing, said auxiliary casing provided with alining ports therethrough and one of said ports being in communication with one of said inlet ports, a movable valve member within said valve casing and a finger projection carried thereby and closely fitting said auxiliary casing, said projection having a transverse port therethrough said valve casing provided with an exhaust port, said valve member provided with a transverse port adapted to make and break communication between the other inlet and the outlet port.

5. A device of the class described, comprising a steering lever, a signal, a compressed fluid storage tank, a valve casing provided with inlet ports and an outlet port, a tubular passage between said tank and inlet ports and between said outlet port and signal, an auxiliary casing positioned within said valve casing, alining ports through said auxiliary casing and one of said ports in communication with one of said inlet ports, said valve casing provided with a compression chamber and having an exhaust port leading therefrom, the other of the ports of said auxiliary casing communicating with said compression chamber, a movable valve member fitting both of said casings, said valve casing mounted directly upon one side of said steering lever, said steering lever provided with a perforation through the integral body thereof, a projecting rod carried by the movable member, said rod positioned through said perforation and adapted to be engaged for operating the valve from the other side of the lever from that on which the casing is mounted.

In testimony whereof I affix my signature in presence of two witnesses.

JAMES T. JOHNSON.

Witnesses:
  WM. C. JOHNSON,
  J. T. SETTLE.